(12) United States Patent
Leathers et al.

(10) Patent No.: US 12,026,893 B1
(45) Date of Patent: Jul. 2, 2024

(54) IMAGE BACKGROUND REMOVAL

(71) Applicant: Intuit Inc., Mountain View, CA (US)

(72) Inventors: Benjamin Nathaniel Leathers, Stone Mountain, GA (US); Frank Andrew Vaughan, Smyrna, GA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/129,773

(22) Filed: Mar. 31, 2023

(51) Int. Cl.
*G06T 7/194* (2017.01)
*G06T 5/50* (2006.01)
*G06T 7/12* (2017.01)
*G06V 10/74* (2022.01)
*H04N 1/60* (2006.01)

(52) U.S. Cl.
CPC ............... *G06T 7/194* (2017.01); *G06T 5/50* (2013.01); *G06T 7/12* (2017.01); *G06V 10/761* (2022.01); *H04N 1/6008* (2013.01); *H04N 1/6016* (2013.01); *G06T 2207/10024* (2013.01); *G06T 2207/20221* (2013.01)

(58) Field of Classification Search
CPC .. G06T 5/50; G06T 7/12; G06T 7/194; G06T 2207/10024; G06T 2207/20221; G06V 10/761; H04N 1/6008; H04N 1/6016
See application file for complete search history.

(56) References Cited

U.S. PATENT DOCUMENTS

| | | | |
|---|---|---|---|
| 4,868,752 A * | 9/1989 | Fujii | G05D 1/0246 701/28 |
| 6,337,925 B1 * | 1/2002 | Cohen | G06T 7/194 382/199 |
| 6,903,741 B2 * | 6/2005 | Corbetta | G06T 15/60 345/426 |
| 8,121,407 B1 * | 2/2012 | K | G06T 7/187 382/175 |
| 9,942,440 B2 * | 4/2018 | Kurzhanskiy | G06T 11/60 |
| 10,015,359 B1 * | 7/2018 | Kurzhanskiy | H04N 1/3873 |
| 11,443,436 B2 * | 9/2022 | Liu | G06T 7/194 |
| 11,450,087 B2 * | 9/2022 | Panetta | G06T 5/50 |
| 11,461,880 B2 * | 10/2022 | Zhang | G06T 7/12 |
| 11,727,577 B2 * | 8/2023 | Zhou | G06V 10/446 382/164 |
| 11,948,301 B2 * | 4/2024 | Min | A61B 5/7275 |
| 11,949,698 B1 * | 4/2024 | Vincent | H04L 63/1416 |
| 2005/0041860 A1 * | 2/2005 | Jager | G06V 30/416 382/173 |

(Continued)

FOREIGN PATENT DOCUMENTS

WO WO-2008039693 A2 * 4/2008 .......... G06T 15/503

OTHER PUBLICATIONS

Hanif et al., 2022, "Blind bleed-through removal in color ancient manuscripts" (pp. 12321-12335) (Year: 2022).*

*Primary Examiner* — Manav Seth
(74) *Attorney, Agent, or Firm* — Lathrop GPM LLP

(57) ABSTRACT

A method implements image background removal. The method includes receiving an image and processing the image using a first color distance threshold to generate a first alpha mask. The method further includes processing the first alpha mask using a cartesian edge threshold and a second color distance threshold to generate a second alpha mask. The method further includes presenting the image combined with the second alpha mask in a combined image.

20 Claims, 6 Drawing Sheets

(56) References Cited

U.S. PATENT DOCUMENTS

| | | | | |
|---|---|---|---|---|
| 2007/0009153 | A1* | 1/2007 | Gallafent | G06T 7/11 |
| | | | | 382/173 |
| 2011/0075926 | A1* | 3/2011 | Piramuthu | G06T 7/11 |
| | | | | 382/173 |
| 2011/0310154 | A1* | 12/2011 | Mantell | H04N 1/4092 |
| | | | | 347/15 |
| 2012/0134581 | A1* | 5/2012 | Matsuda | H04N 1/41 |
| | | | | 382/164 |
| 2013/0002729 | A1* | 1/2013 | Lee | G09G 3/3406 |
| | | | | 345/690 |
| 2013/0022253 | A1* | 1/2013 | Lee | G06T 7/33 |
| | | | | 382/131 |
| 2013/0228630 | A1* | 9/2013 | Fan | G06K 19/06103 |
| | | | | 235/494 |
| 2015/0242697 | A1* | 8/2015 | Guo | G06T 3/0093 |
| | | | | 382/128 |
| 2018/0040120 | A1* | 2/2018 | Faelan | G06T 11/60 |
| 2018/0232887 | A1* | 8/2018 | Lin | G06T 7/11 |
| 2018/0365813 | A1* | 12/2018 | Leong | G06T 7/11 |
| 2019/0340462 | A1* | 11/2019 | Pao | G06V 10/82 |
| 2021/0035533 | A1* | 2/2021 | Tanaka | G09G 5/38 |
| 2021/0357684 | A1* | 11/2021 | Amirghodsi | G06V 10/761 |

\* cited by examiner

IMAGE BACKGROUND REMOVAL

BACKGROUND

Images include pixels that may be part of a foreground or background of the image. For example, logo images include the logo in foreground pixels and the remaining pixels may be background pixels. To use a logo image with different backgrounds, the backgrounds pixels may be identified and removed. The selection and removal of background pixels from images is a laborious and time-consuming task when performed with common photo-editing tools. Photo-editing tools may allow for the user to select a color as a background color in order to identify each pixel that uses the background color as the background pixel. However, pixels at the edges of the foreground and background of the image may be dithered to have a color value between foreground and background colors. By the dithering, the original image color boundary is not abrupt. However, the result is that a user selecting a single color does not result in fully removing the background. Thus, a user may then go in by hand to identify additional background pixels that did not use the specified background color. A challenge is for computing systems to automatically identify and remove backgrounds from images.

SUMMARY

In general, in one or more aspects, the disclosure relates to a method implementing image background removal. The method includes receiving an image and processing the image using a first color distance threshold to generate a first alpha mask. The method further includes processing the first alpha mask using a cartesian edge threshold and a second color distance threshold to generate a second alpha mask. The method further includes presenting the image combined with the second alpha mask in a combined image.

In general, in one or more aspects, the disclosure relates to a system that includes a color mask controller configured to generate a first alpha mask and an edge mask controller configured to generate a second alpha mask. The system further includes an application executing on one or more processors and configured for receiving an image and processing, by the color mask controller, the image using a first color distance threshold to generate the first alpha mask. The application is further configured for processing, by the edge mask controller, the first alpha mask using a cartesian edge threshold and a second color distance threshold to generate the second alpha mask and presenting the image combined with the second alpha mask in a combined image.

In general, in one or more aspects, the disclosure relates to a method implementing image background removal. The method includes selecting an image and processing the image using a first color distance threshold to generate a first alpha mask. The method further includes processing the first alpha mask using a cartesian edge threshold and a second color distance threshold to generate a second alpha mask and displaying the image combined with the second alpha mask in a combined image.

Other aspects of the invention will be apparent from the following description and the appended claims.

DETAILED DESCRIPTION

In general, embodiments perform image background removal, which is improved technique by also removing background pixels near the edges of foreground and background pixels. For example, an image with a black logo on a white background may have edge pixels with grey color values at or near the edges of the boundaries between foreground (black) and background (white) pixels. Because the grey pixels are neither white nor black, determining which pixels correspond to the logo and which to the background may be difficult. Similar issues may occur with color images in which pixels at the edges of the foreground and background of the image are dithered to have a color that represents both a foreground portion of the image and the background portion of the image.

One or more embodiments include two levels of removal. A first level of removal is performed with a first alpha mask using a first color distance threshold to remove background. The second level of removal is for the edge pixels by using a second color distance threshold for edge pixels.

In one example, the MAILCHIMP® group decides to use their logo in an email campaign to increase brand awareness. However, the edges between the foreground and background of the logo may thwart presenting a crisp and clean brand image. The MAILCHIMP® group uses the system to overlay the logo onto a different background after removing the background from the logo.

Figure 1:
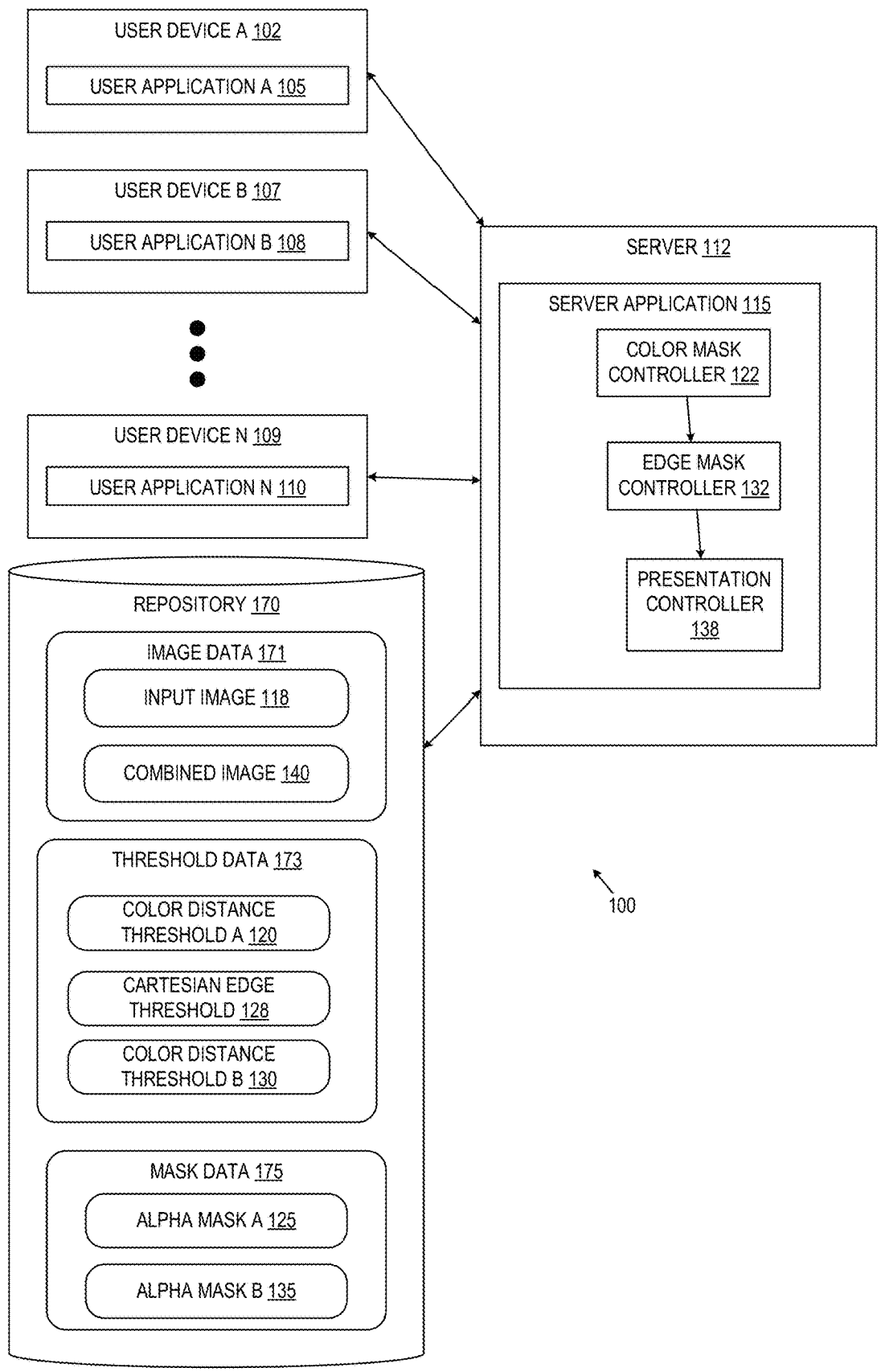
FIG. 1 shows diagrams of systems in accordance with disclosed embodiments.

Turning to the Figures, FIG. 1 shows a diagram of a system in accordance with one or more embodiments. The system (100) performs background removal. The system (100) is configured to communicate with the user devices A (102) and B (107) through N (109). The system (100) includes the repository (170) and the server (112). Each of these components is described below.

The repository (170) includes image data (171), threshold data (173), and mask data (175). The image data (170) includes an input image (118) and a combined image (140).

The input image (118) includes a collection of pixels. In one embodiment, the collection of pixels includes foreground pixels (which may include the logo) and background pixels (which may not include the logo). The foreground pixels and the background pixels are not defined or clearly delineated in the image. Namely, whether the pixel is a foreground pixel or background pixel is unspecified in the input image (118).

Each pixel in the input image has a corresponding horizontal location and corresponding vertical location within the input image (118) and includes at least one value that identifies a color for the pixel. Each pixel may be a foreground pixel or a background pixel. The color values for the input image (318) are part of a color space that defines possible color values and meanings of the color values for the color of a pixel. Color spaces may be device-dependent (e.g., (red, green, and blue) RBG color space, (cyan, magenta, and yellow) CMY color space, (cyan, magenta, yellow, and black) CMYK color space, (hue, saturation, and value) HSV color space, (hue, saturation, and lightness)

HSL color space, etc.) and may be device-independent (e.g., LAB color space, YUV color space, LUV color space, XYZ color space, etc.). The input image (118) may include channels for different types of color values for a color space. For example, an image in the RGB color space may include a red channel (for red color values), a green channel (for green color values), and a blue channel (for blue color values).

The combined image (140) is generated from the input image (118). In one embodiment, the combined image (140) is the input image (118) with the background removed and a different background included.

The threshold data (173) includes thresholds used by the system (100). For example, the threshold data (173) may include the color distance threshold A (120), cartesian edge threshold (128), and the color distance threshold B (130).

The color distance threshold A (120) is a value that identifies a threshold distance between colors. The color distance threshold may be a numeric value representing the threshold difference between color values (e.g., between a color of a foreground pixel and a color of a background pixel of the input image (118)). The color distance threshold A (120) is used by the color mask controller (122) to distinguish between foreground pixels and background pixels of the input image (318). In one embodiment, the color distance threshold A (120) may be about 10 units defined by the color space of the color values being compared. Other values (5, 15, 20, etc.) may be used. For example, a color with the LAB color space value of "0, 0, 0" is one unit away from the color with the LAB color space value of "0, 0, 1". In the LAB color space, a color may be defined by a combination of a lightness value (L*), a green-red opponent color value (a*), and a blue-yellow opponent color value (b*).

The cartesian edge threshold (128) is a value used to identify the group of pixels to be processed by the edge mask controller (132). The cartesian edge threshold (128) identifies the distance from an edge or boundary between foreground and background pixels. In one embodiment, the cartesian edge threshold (128) may be an integer value, such as 3, 5, etc. For example, when the cartesian edge threshold (128) is "3", any pixel that is within 3 pixels of an edge (i.e., a boundary between a foreground pixel and a background pixel) is within the cartesian edge threshold (128) and identified as an edge pixel.

The color distance threshold B (130) is another value that identifies a threshold distance between colors. The color distance threshold B (130) may be a different value than the color distance threshold A (120) and may be used to identify and remove dithered pixels between foreground pixels and background pixels. The color distance threshold B (130) is used by the edge mask controller (132) to distinguish between foreground pixels and background pixels of the input image (118). In one embodiment, the color distance threshold B (130) may be about 20 units. Other values (10, 40, etc.) may be used. In one embodiment, the color distance threshold B (130) is larger than the color distance threshold A (120) to remove edge pixels from the alpha mask A (125) (described below).

The mask data (175) includes alpha masks used by the system (100). For example, the mask data (175) may include the alpha mask A (125) and the alpha mask B (135).

The alpha mask A (125) is a collection of values (referred to as alpha values), each value with a location matching the location of the corresponding pixel of the input image (118). The alpha mask A (125) may have the same resolution (i.e., the same number of pixels as) the input image (118). The values in the alpha mask A (125) identify alpha values for pixels in the input image (118). An alpha value identifies a level of transparency (or opacity) for the pixel. In one embodiment, the range of alpha values may be from 0% to 100% where 0% identifies the pixel as transparent and 100% identifies the pixel as opaque. Different ranges and value systems may be used for alpha values (e.g., 0 for transparent and 255 for opaque). When overlaid, a "transparent" pixel will not change the color of an underlying pixel onto which the transparent pixel is being overlaid. When overlaid, an "opaque" pixel sets the color of an underlying pixel to the color of the opaque pixel being overlaid. A transparent pixel is identified as a background pixel of the input image (118) and an opaque pixel is identified as a foreground pixel of the input image (118).

The alpha mask B (135) is another collection of alpha values that has the resolution of the alpha mask A (125) and the input image (118). The alpha mask B (135) may be an improvement of the alpha mask A (125) in which dithered pixels (pixels with colors between the color of a foreground pixel and the background color) at the edges of the foreground and background of the input image (118) are removed.

Figure 5A:
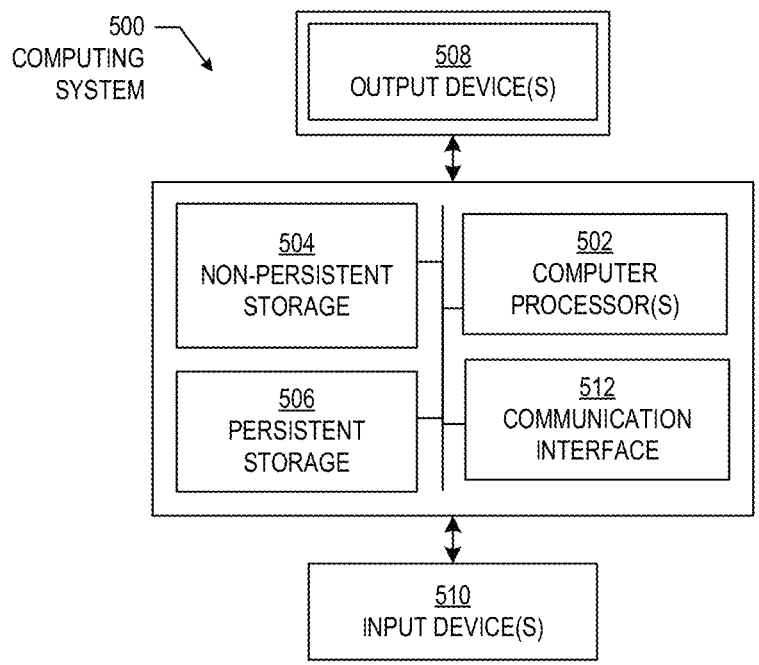
FIGS. 5A and 5B show computing systems in accordance with disclosed embodiments.

The server (112) is a computing system (further described in FIG. 5A). The server (112) may include multiple physical and virtual computing systems that form part of a cloud computing environment. In one embodiment, execution of the instructions, programs, and applications of the server (112) is distributed to multiple physical and virtual computing systems in the cloud computing environment. The server (112) may include the server application (115).

The server application (115) is a collection of programs with instructions that may execute on multiple servers of a cloud environment, including the server (112). The server application (115) is configured to process the input image (118) to remove the background of the input image (118) and generate the combined image (140). In one embodiment, the server application (115) hosts websites and may serve structured documents (hypertext markup language (HTML) pages, extensible markup language (XML) pages, JavaScript Object Notation (JSON) files and messages, etc.) to interact with the user devices A (102) and B (107) through N (109). Requests from the user devices A (102) and B (107) through N (109) may be processed to generate the input image (118) used to generate the combined image (140). The combined image (140) may be further processed to generate responses that are returned to the user devices A (102) and B (107) through N (109). The server application (115) may include the color mask controller (122), the edge mask controller (132), and the presentation controller (138).

The color mask controller (122) is a collection of hardware and software components with programs and instructions that may operate on the server (112). The color mask controller (122) is configured to process the input image (118) using the color distance threshold A (120) to generate the alpha mask A (125).

The edge mask controller (132) is a collection of hardware and/or software components with programs and instructions that may operate on the server (112). The edge mask controller (132) is configured to process the alpha mask A (125) and the input image (118) with the cartesian edge threshold (128) and the color distance threshold B (130) to generate the alpha mask B (135).

The presentation controller (138) is a collection of hardware and software components with programs and instructions that may operate on the server (112). The presentation controller (138) is configured to process the alpha mask B (135) and the input image (118) to generate the combined image (140) and present the combined image (140) to the user devices A (102) and B (107) through N (109).

The user devices A (102) and B (107) through N (109) are computing systems (further described in FIG. 5A). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access, manipulate, and view services and information hosted by the system (100). The user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) include web browser programs that display web pages from the server (112).

As an example, the user application A (105) may be used to send the input image (118) (or a link thereto) to the server (112). The combined image (140) may be received and displayed in response to sending the input image (118).

Figure 5B:
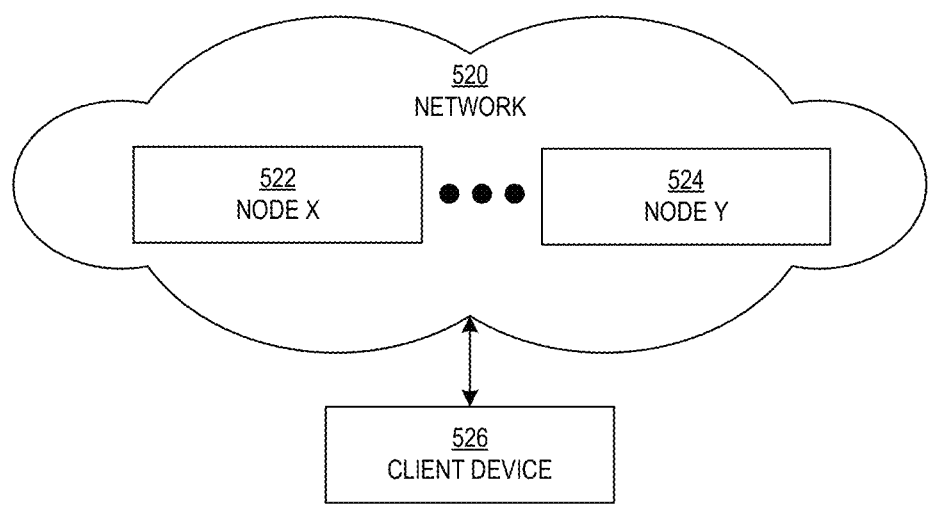

The repository (170) is a computing system that may include multiple computing devices in accordance with the computing system (400) and the nodes (522) and (524) described below in FIGS. 5A and 5B. The repository (170) may be hosted by a cloud services provider that also hosts the server (112). The cloud services provider may provide hosting, virtualization, and data storage services as well as other cloud services to operate and control the data, programs, and applications that store and retrieve data from the repository (170). The data in the repository (170) includes the image data (171), the threshold data (173), and the mask data (175).

Although shown using distributed computing architectures and systems, other architectures and systems may be used. In one embodiment, the server application (115) may be part of a monolithic application that performs image background removal. In one embodiment, the user applications A (105) and B (108) through N (110) may be part of monolithic applications that perform image background removal without the server application (115).

Figure 2:
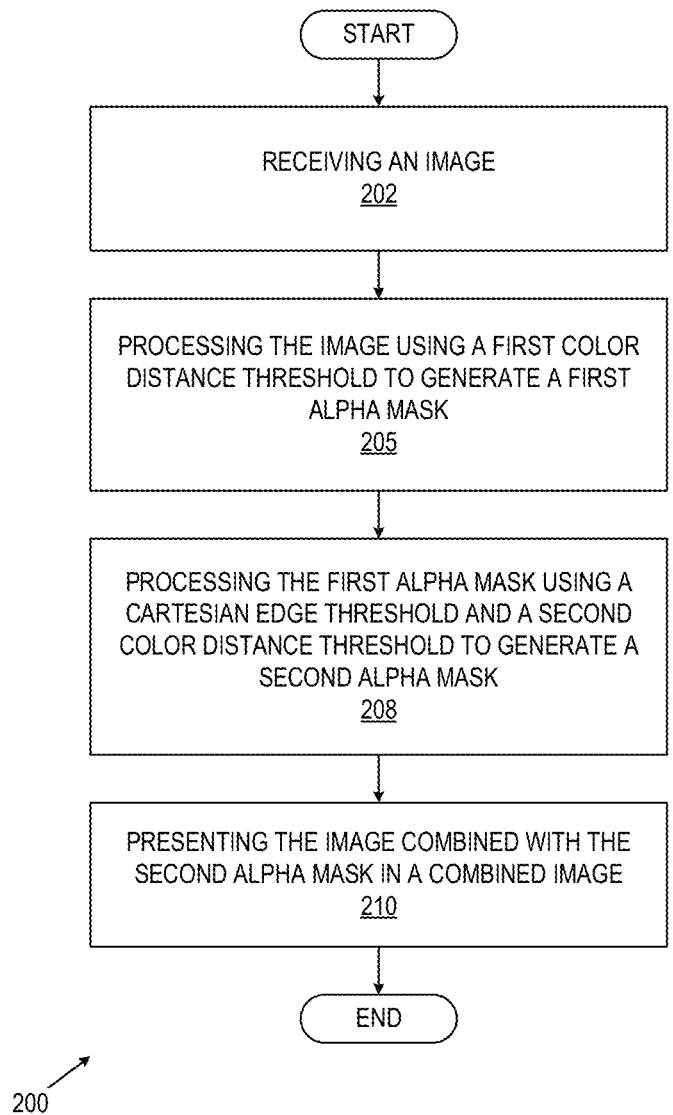
FIG. 2 shows a flowchart in accordance with disclosed embodiments.

Turning to FIG. 2, the process (200) implements image background removal. The process (200) may be performed by a computing device interacting with one or more additional computing devices. For example, the process (200) may execute on a server response to one or more user devices. In one embodiment, the process (200) may be performed on a single device. Process (200) may be performed by the components of FIG. 1.

At Step 202, an image is received. The image is received by a computing process that processes the image, the computing process may execute on a client device or a server device. When a server is used, the image may be selected on a client device, and then the image (or an identifier of the image) may be transmitted to the server.

In one embodiment, a selection of a background pixel, from the image, is received. The background pixel, from which the background color of the image is determined, may be selected by the user. In one embodiment, the background pixel may be selected by a heuristic. For example, a heuristic may define the top left pixel of an image as the background pixel, the top right pixel, etc. The color value of the background pixel may be used as the background color of the image received by the system.

In one embodiment, a background color for the image may be determined using multiple pixels. For example, multiple pixels at the top, left, right, and bottom boundaries of the image may be selected and the background color for the image may be determined by taking an average of the selected pixels.

At Step 205, the image is processed using a first color distance threshold to generate a first alpha mask. The first color distance threshold defines a threshold distance for the color distance between the colors of the background pixel and a pixel from the image. In one embodiment, the first color distance threshold may be 10 units. In one embodiment, the first color distance threshold may be selected by the user.

In one embodiment, processing the image includes calculating the color distance between the background color and the color of the selected pixel. The color distance may be calculated as the Euclidean distance between the color of the selected pixel and the background color.

If the Euclidean distance between the color value of a pixel and the background color identified for the image is greater than the first color distance threshold, then the pixel may be identified as a foreground pixel by setting a value for the pixel to 100% in the first alpha mask for the image. Otherwise, the pixel may be identified as a background pixel by setting a value for the pixel to 0% in the first alpha mask for the image.

In one embodiment, before the image is processed using the first color distance threshold, the image received is encoded using a first color space. The system may convert the color values of the image from the first color space to a second color space. Color spaces that may be used include the CMY color space, CMYK color space, HSV color space, HSL color space, LAB color space, YUV color space, LUV color space, XYZ color space, etc. In one embodiment, the first color space is a device-dependent color space (e.g., RGB, CMY, CMYK, HSV, HSL) and the second color space is a device-independent color space (e.g., LAB, YUV, LUV, XYZ).

In one embodiment, the second color space is the LAB color space. In one embodiment, the first color space is the RGB color space. The RGB color space defines a color with a combination of a red value (r), a green value (g), and a blue value (b). The LAB color space defines a color by a combination of a lightness value (L*), a green-red opponent color value (a*), and a blue-yellow opponent color value (b*).

In one embodiment, processing the image includes selecting a background color. The background color may be automatically selected using a heuristic that specifies that the color of a certain pixel from the input image is used as the background color. In one embodiment, the background pixel selected by the user may contain the background color. In one embodiment, the user may identify the background color by interacting with a user interface. For example, the user interface may be used to type in the value for the background color with a text box. In one embodiment, interaction with the user interface includes receiving a selection from a color picker widget that displays multiple colors from which the user selects the background color.

In one embodiment, processing the image includes selecting a pixel from the image to process. Each pixel from the image may be selected and the selection may use a loop, a stack, a queue, etc., to iterate through each of the pixels of the image.

In one embodiment, processing the image includes comparing the color distance to the first color distance threshold to generate a first color distance comparison. In one embodiment, when the color distance is greater than the first color distance threshold, the pixel may be identified as a foreground pixel. When the image is a logo image, a foreground pixel is a pixel that includes the logo and is not a part of the background. In one embodiment, when the color distance is not greater than the first color distance threshold, the pixel may be identified as a background pixel. A background pixel may not include a portion of a logo in a logo image.

In one embodiment, processing the image includes adjusting the first alpha mask using the first color distance comparison. The pixels of the first alpha mask are updated to include the results of the first color distance comparisons. When a pixel is determined to be a foreground pixel (e.g., the color distance satisfies the first color distance threshold), the alpha value for the corresponding pixel in the alpha mask may be set to 100%. Otherwise, the alpha value may be set to 0% for a background pixel.

At Step 208, the first alpha mask is processed using a cartesian edge threshold and a second color distance threshold to generate a second alpha mask. The cartesian edge threshold is used to identify pixels within a threshold distance to an edge between a foreground pixel and a background pixel from the first alpha mask. The second alpha mask may be an updated version of the first alpha mask. In one embodiment, the cartesian edge threshold is selected by a developer of the system.

In one embodiment, processing the first alpha mask includes selecting an image pixel using the cartesian edge threshold. The image pixel is an edge pixel that is within a threshold distance to an edge between adjacent foreground and background pixels from the first alpha mask. For example, the cartesian edge threshold may be 3 to 5 pixels from an edge between adjacent foreground and background pixels. Each of the edge pixels identified from the first alpha mask are processed by the system with the second color distance threshold.

In one embodiment, processing the first alpha mask includes comparing the color distance to the second color distance threshold to generate a second color distance comparison. The color distance that was previously calculated in Step 205 may be reused in Step 208 and checked against the second color distance threshold. The color distance is the distance between the background color and the pixel color of the edge pixel being processed.

In one embodiment, processing the first alpha mask includes adjusting the second alpha mask to identify an alpha mask pixel, corresponding to the edge pixel, as one of a foreground pixel and a background pixel using the second color distance comparison. For example, the second color distance threshold may be a value of 30. In one embodiment, when the color distance is less than 30, then the pixel is identified as a background pixel in the second alpha mask, which may be different from the first alpha mask.

In one embodiment, the first color distance threshold is less than the second color distance threshold. For example, the first color distance threshold may have a value of 7 and the second color distance threshold may have a value of 12.

At Step 210, the image combined with the second alpha mask is presented in a combined image. In one embodiment, presenting the combined image includes forming the combined image by copying the color values from the original input image to the color channels of the combined image and including the second alpha mask as an alpha channel of the combined image.

In one embodiment, presenting the combined image includes forming the combined image by applying the second alpha mask to the original image to create a masked image that is overlaid on top of a background image. The background image may be a single color. In one embodiment, the background image includes multiple colors.

In one embodiment, presenting the image includes combining the second alpha mask with the image to overlay the image onto a background. The foreground pixels may be light or dark and overlaid onto a light or dark background. In one embodiment, the foreground pixels are "light" when the average color value of the foreground pixels is closer to the color white than to the color black. Similarly, the foreground pixels are "dark" when the average color value of the foreground pixels is closer to the color black than to the color white. Whether the background is light or dark may be determined in a similar fashion. In one embodiment, when the foreground pixels are light, and the background pixels are dark (or if the foreground pixels are dark and the background pixels are light) the foreground pixels may be overlaid onto the background to form the combined image. In one embodiment, when the foreground pixels are light, and the background pixels are light (or if the foreground pixels are dark and the background pixels are dark) the color values of the foreground pixels may be inverted and then overlaid onto the background to form the combined image.

Figure 3:
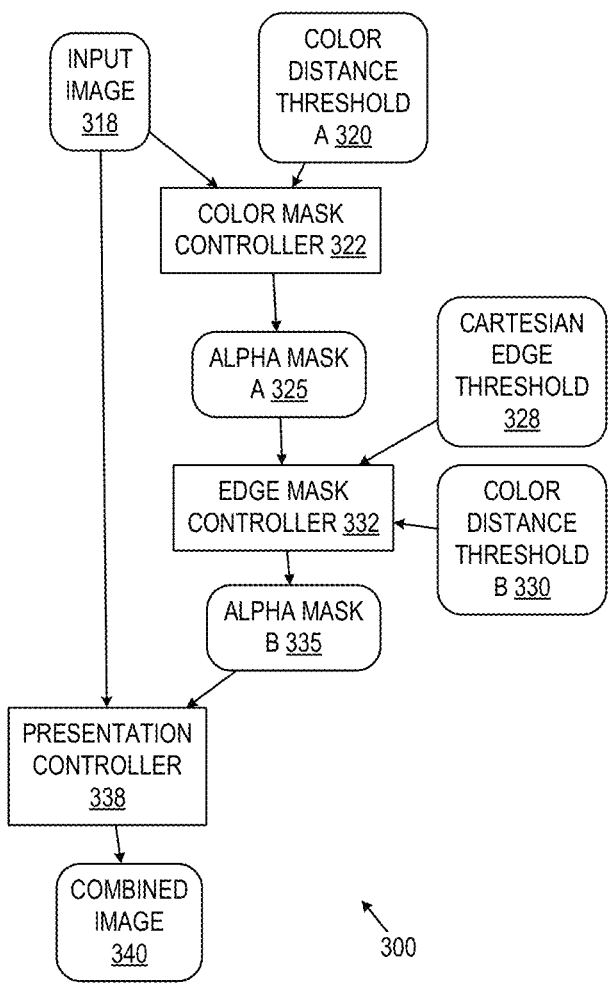
FIG. 3 shows a data flow diagram in accordance with disclosed embodiments.

Turning to FIG. 3, the data flow (300) is a flow of data through a computing system. For example, the data flow (300) may be performed with the system (100) of FIG. 1.

The input image (318) is an image processed by an application (e.g., the server application (115) of FIG. 1). In one embodiment, the input image (318) is a logo image. In one embodiment, the input image (318) is received from a user device (e.g., one of the user devices A (102) and B (107) through N (109) of FIG. 1).

The color distance threshold A (320) may identify a minimum distance in a color space between two colors (e.g., between a color of a foreground pixel and a color of a background pixel) and is used to generate the alpha mask A (325).

The alpha mask A (325) includes a value for each pixel in the input image (318) that is used to identify if the pixel is a foreground pixel or a background pixel. The alpha mask A (325) is generated using the color distance threshold A (320).

The color mask controller (322) is a collection of hardware and software components with programs and instructions that may operate on a computing system. The color mask controller (322) processes the input image (318) using the color distance threshold A (320) to generate the alpha mask A (325). In one embodiment, the color mask controller (322) converts the input image (318) from a first color space (e.g., RGB) to a second color space (e.g., LAB), identifies a background color of the input image (318), generates a color distance between the colors of the pixels and the background color, compares the color distances to the color distance threshold A (320), and generates the alpha mask A (325) from the comparisons. For example, if the color value of a pixel minus the color value of the background of the input image (318) is greater than the color distance threshold A (320), then the pixel may be identified in the alpha mask A (325) as a foreground pixel. Otherwise, the pixel may be identified as a background pixel.

The cartesian edge threshold (328) identifies the distance from an edge or boundary between foreground and background pixels and is used to generate the alpha mask B (335).

The color distance threshold B (330) may identify the distance in a color space between two colors and is used to generate the alpha mask B (335).

The edge mask controller (332) is a collection of hardware and/or software components with programs and instructions that may operate on the server (312). The edge mask controller (332) processes the alpha mask A (325) with the cartesian edge threshold (328) and then the color distance threshold B (330) to generate the alpha mask B (335). In one embodiment, the edge mask controller (332) identifies edge pixels using the cartesian edge threshold (328) and then uses the color distance threshold B (330) to determine if the edge pixels are background or foreground pixels. The edge mask controller (332) may update the alpha mask A (325) to generate the alpha mask B (335) based on the determinations made using the color distance threshold B (330).

For example, a pixel is identified as an edge pixel when the Euclidean distance between the pixel and the closest boundary between foreground and background pixels is less than the cartesian edge threshold (328). The color distance between the color value of the edge pixel and the background color of the input image (318) are compared to the color distance threshold B (330). In one embodiment, when the color distance between the edge pixel and the background color are greater than the color distance threshold B (330), then the pixel is identified as a foreground pixel (with an alpha value of 100%). Otherwise, the pixel may be identified as a background pixel (with an alpha value of 0%).

The alpha mask B (335) includes a value for each pixel in the input image (318) that is used to identify if the pixel is a foreground pixel or a background pixel. The alpha mask B (335) is generated using the color distance threshold B (330).

The combined image (340) is an image generated by the presentation controller (338). The combined image (340) may include the foreground pixels (and corresponding color values) from the input image (318). In one embodiment, the combined image (340) may include an alpha channel that identifies foreground and background pixels. In one embodiment, the combined image (340) may include the foreground pixels from the input image (318) overlaid onto a different background.

The presentation controller (338) is a collection of hardware and software components with programs and instructions that may operate on a computing system. The presentation controller (338) processes the alpha mask B (335) and the input image (318) to generate the combined image (340) and presents the combined image (340). In one embodiment, the presentation controller (338) may combine the alpha mask B (335) with the input image (318) to create an image with channels for the color values (e.g., red, green, blue) and a channel for the alpha values. In one embodiment, the presentation controller (338) may overlay the foreground pixels of the inpIt image (318) onto a new background color or image.

Figure 4A:
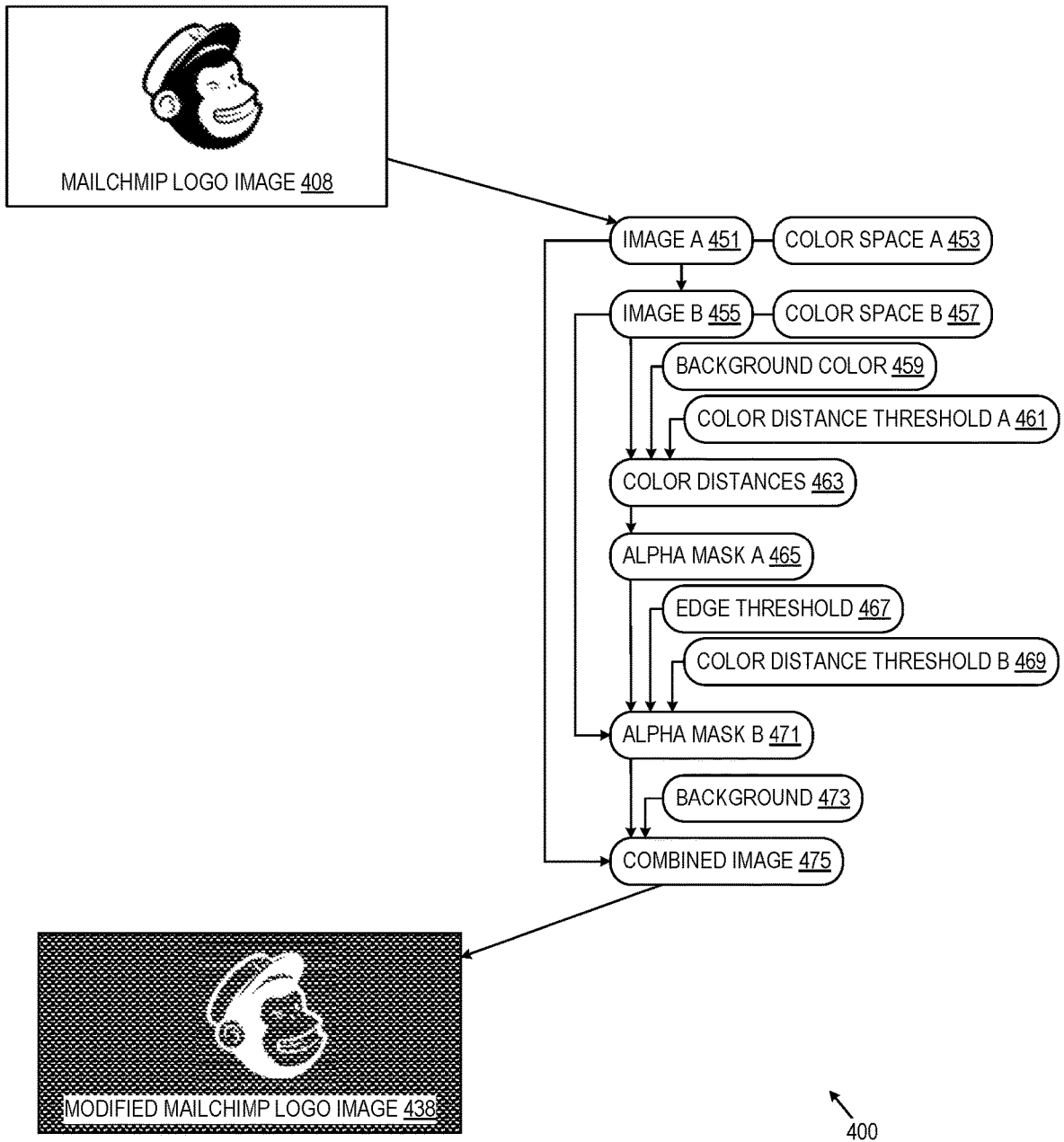
FIGS. 4A and 4B show examples in accordance with disclosed embodiments.

Turning to FIG. 4A, the sequence (400) implements image background removal. To create a crisp and clean brand image that can be used on multiple backgrounds, the MAILCHIMP® group uses a computing system to perform the sequence (400). The sequence (400) may be performed with a combination of user devices and servers, including those described in FIG. 1.

The MAILCHIMP® group logo image (408) includes a black logo on a white background and some grey pixels between the white and black portions of the MAILCHIMP® group logo image (408). The black pixels are foreground pixels and the white pixels are background pixels.

The MAILCHIMP® group logo image (408) may be received as the image A (451). The image A (451) is encoded using the color space A (453). The color space A (453) is the RGB color space.

The server application (452) converts the image A (451) to the image B (455) by changing the color values from the color space A (453) to color values for the color space B (457). The color space B (457) is the LAB color space.

The background color (459) is identified (e.g., by using a heuristic). The image B is then processed (455) using the background color (459) and the color distance threshold A (461) to generate the color distances (463).

The color distances (463) are the distances between the color values of the pixels of the image B (455) and the color value of the background color (459), which are in the color space B (457). The color distances (463) are Euclidean distances in the color space B (457).

The color distances (463) are processed with the color distance threshold A (461) to generate the alpha mask A (465). The color distances (463) that satisfy the color distance threshold A (461) are identified as foreground pixels in the alpha mask A (465) with an alpha value of 100%.

After generating the alpha mask A (465), the alpha mask A (465) is processed to generate the alpha mask B (471). The server application (452) uses the edge threshold (467) to identify the edge pixels of the alpha mask A (465) that correspond to edge pixels of the image B (455). The color distances (463) that correspond to the edge pixels identified with the edge threshold (467) are compared to the color distance threshold B (469) to generate the alpha mask B (471).

The alpha mask B (471) may be generated by copying the alpha mask A (465) and then updated the edge pixels within the alpha mask B (471). The color values of the edge pixels within the alpha mask B (471) are compared to the color distance threshold B (469) to determine, individually, if an edge pixel is a foreground pixel (set to an alpha value of 100%) or a background pixel (set to an alpha value of 0%).

After generating the alpha mask B (471), the image A (451) is combined with the background (473) using the alpha mask B (471). In one embodiment, the alpha mask B (471) is applied to the image B (455) by multiplying the alpha values from the alpha mask B (471) with the color values of the image B (455). The foreground pixels (which do not have a zero value) are then overlaid onto the background (473). The background (473) may be an image. In one embodiment, the background (473) is a solid color. The combined image (475) may be transmitted to the user devices and displayed as the modified MAILCHIMP® group logo image (438).

The modified MAILCHIMP® group logo image (438) is modified from the MAILCHIMP® group logo image (408) by changing the background and by changing the color value of the foreground pixels that correspond to the logo in the MAILCHIMP® group logo image (408). Additionally, responsive to the new background being dark and the original logo being dark, the color values of the logo (the foreground pixels) are inverted from black to white.

Figure 4B:
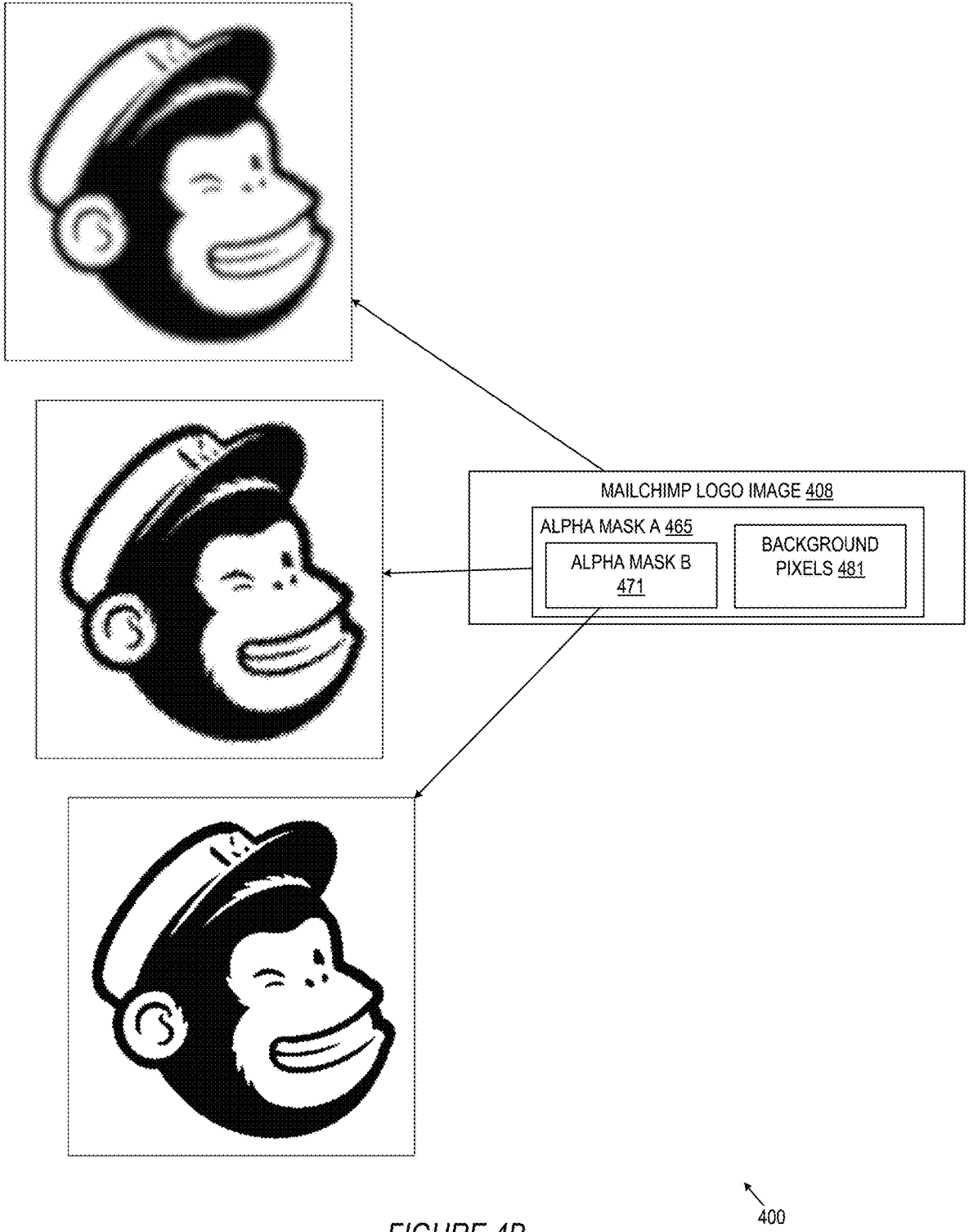

Turning to FIG. 4B, the MAILCHIMP® group logo image (408) includes black and white pixels. The black pixels are foreground pixels and the white pixels are background pixels. Additionally, grey pixels, which may be part of the background) are included between the black and white pixels. The alpha mask A (465) shows foreground pixels as black and background pixels as white. The alpha mask A (465) identifies too many grey pixels as foreground pixels leading an appearance of fuzzy borders.

After generating the alpha mask A (465), the alpha mask B (471) is generated using a different color distance threshold. The alpha mask A (465) and the alpha mask B (471) differ by the background pixels (481). The background pixels (481) are background pixels from the MAILCHIMP® group logo image (408) but were identified as foreground pixels in the alpha mask A (465) giving the alpha mask A (465) a grainy appearance. Subsequent processing of the alpha mask A (465) using the second color distance threshold changed the identification of the background pixels (481) to be identified as background pixels in the alpha mask B (471). By using the second color distance threshold for the alpha mask B (471), the edges of the MAILCHIMP® group logo image (408) are crisply defined in the alpha mask B (471).

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504), persistent storage (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output device(s) (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output device(s) (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a computer program product that includes a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments of the invention.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

The figures of the disclosure show diagrams of embodiments that are in accordance with the disclosure. The embodiments of the figures may be combined and may include or be included within the features and embodiments described in the other figures of the application. The features and elements of the figures are, individually and as a combination, improvements to the technology of computer implemented mask generation and background removal. The various elements, systems, components, and steps shown in the figures may be omitted, repeated, combined, and/or altered as shown from the figures. Accordingly, the scope of the present disclosure should not be considered limited to the specific arrangements shown in the figures.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method comprising:
   receiving an image;
   processing the image using a first color distance threshold to generate a first alpha mask, wherein processing the image using the first color distance threshold comprises:
      calculating a first color distance between a pixel color of a first image pixel of the image and a background color, and
      generating the first alpha mask using a first comparison of the first color distance to the first color distance threshold;
   processing the first alpha mask using a cartesian edge threshold and a second color distance threshold to generate a second alpha mask, wherein the cartesian edge threshold is at least two, and wherein processing the first alpha mask comprises:
      determining a cartesian distance from a location of a second image pixel and a location of an edge in the first alpha mask, and
      selecting the second image pixel when the cartesian distance satisfies the cartesian edge threshold,
      obtaining a second color distance of the selected second image pixel and the background color, and
      generating the second alpha mask using a second comparison of the second color distance to the second color distance threshold,
      wherein the second color distance threshold is greater than the first color distance threshold; and
   presenting the image combined with the second alpha mask in a combined image.

2. The method of claim 1, further comprising:
   receiving the image, wherein the image is a logo image and comprises a plurality of foreground pixels and a plurality of background pixels; and
   receiving a selection of a background pixel of the plurality of background pixels.

3. The method of claim 1, further comprising:
   processing the image by:
      converting the image from a first color space to a second color space, wherein the first color space is a red green blue (RBG) color space in which a color is defined by a combination of a red value, a green value, and a blue value.

4. The method of claim 1, further comprising:
   processing the image by:
      converting the image from a first color space to a second color space, wherein the second color space is defined to have numerical changes between colors that correspond to perceived changes between color, wherein the second color space is an LAB color space in which a color is defined by a combination of a lightness value (L*), a green-red opponent color value (a*), and a blue-yellow opponent color value (b*).

5. The method of claim 1, further comprising:
   processing the image by:
      converting the image from a first color space to a second color space, wherein the first color space is a device-dependent color space and the second color space is a device-independent color space.

6. The method of claim 1, wherein processing the image further comprises:
   processing the image to select the background color, wherein generating the first alpha mask comprises:
      identifying an alpha mask pixel, corresponding to the first image pixel, as one of a foreground pixel and a background pixel according to the first comparison.

7. The method of claim 1, wherein generating the second alpha mask comprises:
   identifying an alpha mask pixel, corresponding to the second image pixel, as one of a foreground pixel and a background pixel according to the second comparison.

8. The method of claim 1, wherein the combined image is obtained by:
   combining the second alpha mask with the image to obtain a result, and overlaying the result onto a background.

9. The method of claim 1, wherein the combined image is obtained by:
   inverting the image to obtain an inverted image; and
   combining the second alpha mask with the inverted image to obtain a result, and
   overlaying the result onto a background.

10. A system comprising:
   a color mask controller configured to generate a first alpha mask;
   an edge mask controller configured to generate a second alpha mask; and
   an application executing on one or more processors and configured for:
      receiving an image,
      processing, by the color mask controller, the image using a first color distance threshold to generate the first alpha mask, wherein processing the image using the first color distance threshold comprises:

calculating a first color distance between a pixel color of a first image pixel of the image and a background color, and generating the first alpha mask using a first comparison of the first color distance to the first color distance threshold, processing, by the edge mask controller, the first alpha mask using a cartesian edge threshold and a second color distance threshold to generate the second alpha mask, wherein the cartesian edge threshold is at least two, and wherein processing the first alpha mask comprises:

determining a cartesian distance from a location of a second image pixel and a location of an edge in the first alpha mask, and selecting the second image pixel when the cartesian distance satisfies the cartesian edge threshold, obtaining a second color distance of the selected second image pixel and the background color, and generating the second alpha mask using a second comparison of the second color distance to the second color distance threshold, wherein the second color distance threshold is greater than the first color distance threshold, and presenting the image combined with the second alpha mask in a combined image.

11. The system of claim 10, wherein the application is further configured for:

receiving the image, wherein the image is a logo image and comprises a plurality of foreground pixels and a plurality of background pixels; and receiving a selection of a background pixel of the plurality of background pixels.

12. The system of claim 10, wherein the application is further configured for:

processing the image by:

converting the image from a first color space to a second color space, wherein the first color space is a red green blue (RBG) color space in which a color is defined by a combination of a red value, a green value, and a blue value.

13. The system of claim 10, wherein the application is further configured for:

processing the image by:

converting the image from a first color space to a second color space, wherein the second color space is defined to have numerical changes between colors that correspond to perceived changes between color, wherein the second color space is an LAB color space in which a color is defined by a combination of a lightness value (L*), a green-red opponent color value (a*), and a blue-yellow opponent color value (b*).

14. The system of claim 10, wherein the application is further configured for:

processing the image by:

converting the image from a first color space to a second color space, wherein the first color space is a device-dependent color space and the second color space is a device-independent color space.

15. The system of claim 10, wherein the application is further configured for:

processing the image to select the background color, wherein generating the first alpha mask comprises identifying an alpha mask pixel, corresponding to the first image pixel, as one of a foreground pixel and a background pixel according to the first comparison.

16. The system of claim 10, wherein generating the second alpha mask comprises:

identifying an alpha mask pixel, corresponding to the second image pixel, as one of a foreground pixel and a background pixel according to the second comparison.

17. The system of claim 10, wherein the combined image is obtained by:

combining the second alpha mask with the image to obtain a result, and overlaying the result onto a background.

18. A method comprising:

selecting an image;

processing the image using a first color distance threshold to generate a first alpha mask, wherein processing the image using the first color distance threshold comprises:

calculating a first color distance between a pixel color of a first image pixel of the image and a background color, and generating the first alpha mask using a first comparison of the first color distance to the first color distance threshold;

processing the first alpha mask using a cartesian edge threshold and a second color distance threshold to generate a second alpha mask, wherein the cartesian edge threshold is at least two, and wherein processing the first alpha mask comprises:

determining a cartesian distance from a location of a second image pixel and a location of an edge in the first alpha mask, and selecting the second image pixel when the cartesian distance satisfies the cartesian edge threshold, obtaining a second color distance of the selected second image pixel and the background color, and generating the second alpha mask using a second comparison of the second color distance to the second color distance threshold, wherein the second color distance threshold is greater than the first color distance threshold; and displaying the image combined with the second alpha mask in a combined image.

19. The method of claim 1, wherein the first image pixel is the same as the second image pixel, and wherein the second alpha mask is a revision of the first alpha mask.

20. The method of claim 19, wherein obtaining the second color distance comprises reusing the first color distance as the second color distance.

* * * * *